United States Patent [19]

Schwarz

[11] 4,441,147
[45] Apr. 3, 1984

[54] CIRCUIT ARRANGEMENT FOR THE CONTROLLED SUPPLY TO A LOAD

[75] Inventor: Gerhard E. Schwarz, Altena, Fed. Rep. of Germany

[73] Assignee: Braun Aktiengesellschaft, Kronberg, Fed. Rep. of Germany

[21] Appl. No.: 338,745

[22] Filed: Jan. 11, 1982

[30] Foreign Application Priority Data

Jan. 17, 1981 [DE] Fed. Rep. of Germany ....... 3101375

[51] Int. Cl.³ .............................................. H02M 3/335
[52] U.S. Cl. .......................................... 363/21; 320/40
[58] Field of Search ....................... 363/18, 19, 20, 21, 363/48; 320/39, 40, DIG. 1; 331/112

[56] References Cited

U.S. PATENT DOCUMENTS

| 3,568,038 | 3/1971 | Enders et al. | |
|---|---|---|---|
| 3,702,961 | 11/1972 | Erickson | 331/112 |
| 4,005,351 | 1/1977 | Blum | |
| 4,155,081 | 5/1979 | Haglund | 320/48 |
| 4,316,242 | 2/1982 | Colangelo et al. | 363/21 |
| 4,376,263 | 3/1983 | Pittroff et al. | 320/35 |

FOREIGN PATENT DOCUMENTS 2014377 10/1970 Fed. Rep. of Germany .
2751578 5/1978 Fed. Rep. of Germany .
2948054 6/1981 Fed. Rep. of Germany .
2949421 7/1981 Fed. Rep. of Germany .

Primary Examiner—William M. Shoop
Assistant Examiner—Anita M. Ault
Attorney, Agent, or Firm—Robert A. Shack

[57] ABSTRACT

A circuit for supplying a constant DC voltage to an electrical load and, alternatively, a relatively constant DC current to a storage battery connected in parallel with the electrical load, the circuit including a blocking oscillator having a transformer with primary and secondary windings, a switching transistor having first and second load terminals and a control terminal, and a first resistor, the primary winding, the load terminals of the switching transistor and the first resistor being connected in series across an input voltage source, a rectifier connected in series with the electrical load across the secondary winding, a controlling transistor having first and second load terminals and a control terminal, a reference voltage element connected across the load terminals of the controlling transistor and connected to the control terminal of the switching transistor, and a Zener diode having an anode connected to the control terminal of the controlling transistor and a cathode connected to the parallel arrangement of the electrical load and the storage battery.

6 Claims, 1 Drawing Figure

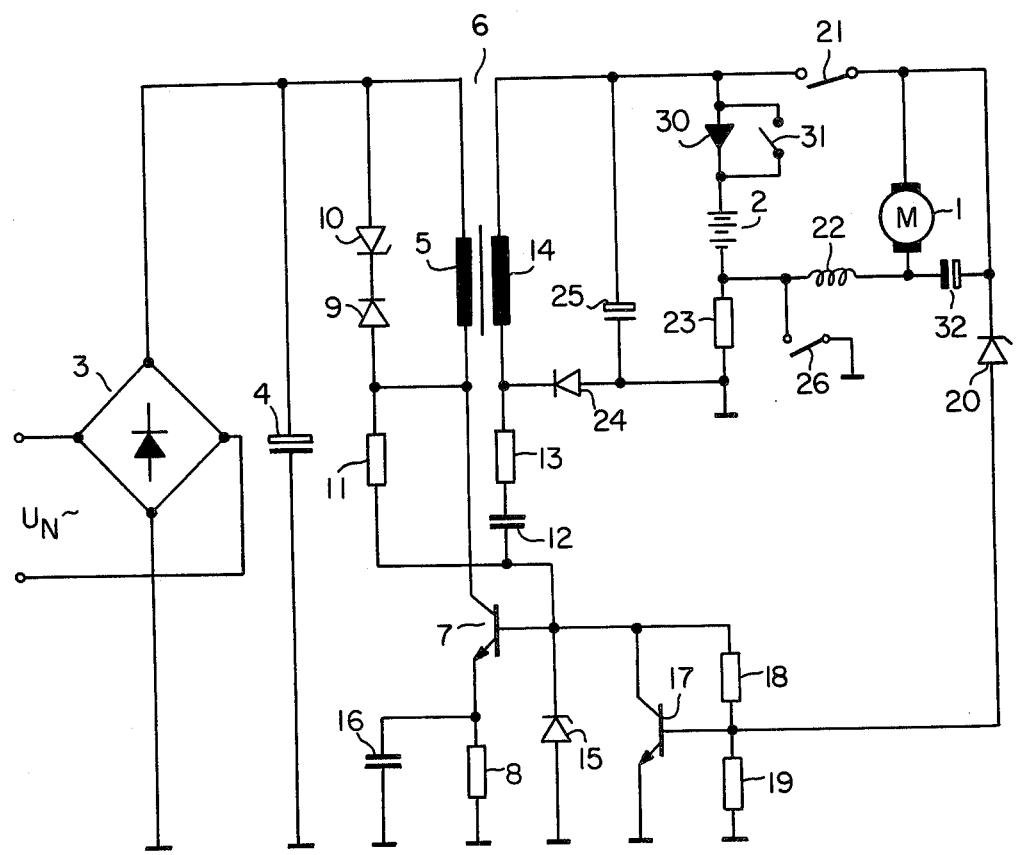

CIRCUIT ARRANGEMENT FOR THE CONTROLLED SUPPLY TO A LOAD

BACKGROUND OF THE INVENTION

1. Field of the Invention

This invention relates to a circuit for converting varying line voltages over a wide range and for selectively supplying either a constant voltage to power a DC motor or a constant current to charge a storage battery.

With portable electric and electronic devices, it is desirable that they can be operated at various voltages, or, if they have storage batteries, that these storage batteries can be charged at various voltages. For example, electric shavers, electronic flash units, portable radios, or the like are often taken along on journeys abroad and are then operated in the various countries with different line voltages. These line voltages generally vary on the one hand between 110 volts and 240 volts and on the other hand between 50 Hz and 60 Hz.

To adapt the small units, and specifically storage batteries, to the various voltages, one needs to transform the voltage, which can be done capacitively or inductively.

2. Description of the Prior Art

A transistor converter circuit is already known, which can generate on the one hand a charging current for a storage battery and on the other hand a higher direct current for driving a motor (DE-OS No. 20 14 377, U.S. Pat. No. 3,568,038). This device has a high-frequency through-flow transformer with a saturable core, whose primary side is connected to the rectified line voltage and whose secondary side supplies the desired current. The known circuit can be operated only at a particular line voltage, and therefore does not automatically adapt itself to different voltages. Since the core of the transformer always reaches the saturation region, its efficiency is low, and there are thermal problems.

Furthermore, a circuit arrangement is known for the controlled supply to a load from input voltage sources of various voltages. This arrangement uses a blocking oscillator type converter, whose primary coil is in series with a switching transistor and an emitter resistor (U.S. Pat. No. 4,005,351). A secondary coil here feeds the load, and feedback is effected through another coil. Another transistor is connected to the base of the switching transistor. The voltage drop at the emitter resistor is applied through a diode to the base of the second transistor. The switch-on time of the switching transistor here depends strongly on the input voltage, i.e. the oscillation frequency of the blocking oscillator type converter depends very strongly on the input voltage and becomes higher with increasing input voltage. To compensate this undesirable circumstance, a relatively expensive control circuit has been provided.

Another known circuit arrangement accounts for the influence of the input voltages on the primary side directly, that is not through the detour via another control circuit and a time delay. This is done by adding another current component to the primary current that is flowing over the emitter resistor. Said current component corresponds to the input voltage, for example, is directy proportional to it (No. P 29 49 421.1-32). As the input voltage rises, the primary current is then shut off earlier, i.e. at a lower value, in such a fashion that the output power has a predetermined dependency on the input voltage, and in particular is dependent on it. A disadvantage of this circuit arrangement is that stabilization of the charge current is not very good.

Finally, another circuit arrangement is known, which uses the voltage drop across the emitter resistor, in order to cut off when a particular primary current is reached (DE-OS No. 27 51 578). In addition, a control voltage is derived from another coil during the blocking phase of a converter. Said control voltage also influences the cut-off time, so that a certain characteristic curve is achieved. As the input voltage increases, the feedback becomes stronger, which counteracts the cut-off through the primary current. The subsequent control circuit therefore must additionally also compensate the larger feedback current.

SUMMARY OF THE INVENTION

In general, the invention features a blocking oscillator converter circuit selectable between a first mode for supplying a relatively constant volage to an electrical load, e.g., a motor, and a second mode for generating a relatively stable charging current.

DESCRIPTION OF THE PREFERRED EMBODIMENT

The drawing shows a circuit arrangement by means of which it is possible to drive a motor 1 and also to charge a storage battery 2 from various input voltages $U_N$.

The input voltage $U_N$ is here conducted through a rectifier 3 to a capacitor 4, one of whose terminals is grounded. The collector-emitter line of a switching transistor 7 is connected in series with the primary coil 5. Here the emitter of the transistor 7 is grounded through a resistor 8. A diode 9 and a zener diode 10 are situated in parallel to the primary coil 5, and their cathodes are connected. The anode of diode 9 is connected both to the primary coil of the transformer 6 and to a resistor 11. Through a capacitor 12 and a resistor 13, the resistor 11 is connected with a secondary coil 14 of the transformer 6. A zener diode 15 is also connected with the capacitor 12 and the resistor 11. The zener diode 15 is connected in parallel to the base-emitter line of the transistor 7. Here the emitter of this transistor 7 is grounded not only through the resistor 8 but also through a capacitor 16. From the cathode of the zener diode 15 and respectively from the base of the transistor 7, a connection leads to the conductor of a transistor 17, whose base is connected with two resistors 18, 19. Of these two transistors, the resistor 19 is grounded and the other resistor is connected with the collector of the transistor 17. The base of the transistor 17 is also connected to the anode of a zener didoe 20, whose cathode is connected with a terminal of the motor 1. A switch 21 is situated between this terminal and the storage battery 2. The other terminal of the motor 1 is connected through a choke 22 with the storage battery 2 and a resistor 23. Here, this resistor 23 is grounded and is connected with the anode of a diode 24, whose cathode is connected to a terminal of the secondary coil 14 of the transformer 6. A capacitor 25 is situated between the other terminal of said secondary coil 14 of the transformer 6 and the anode of the diode 24. Another capacitor is connected between the ground and the terminal of the motor 1 and respectively the choke 22. That end of the choke 22 which is connected to the storage battery 2 can be grounded through a switch 26.

As regards the mode of operation of the circuit arrangement according to the drawing, one must distinguish between the operating state in which the switches 21, 26 are closed and the operating state in which the switches 21, 26 are open. In the closed state, the motor 1 is driven while, in the opened state, the storage battery 2 is charged. The circuit arrangement with the switches open will be considered first. If an alternating line voltage $U_N$ is applied to the rectifier 3, it will be rectified by the latter and will be applied to the capacitor 4. Then the capacitor 12 will be charged through the resistor 11, until the transistor 7 becomes conducting. Since the primary coil represents an inductance, the current through the transistor 7 rises linearly. This current causes a corresponding voltage drop at the resistor 8. When the voltage at the resistor 8 has risen to such an extent that the sum of the voltage at the resistor 8 and of the base-emitter voltage of resistor 7, which is required for current to flow, reaches the breakdown voltage of the zener diode 15, the current through the transistor 7 can rise no further. Thus the magnetic field in the transformer 6 collapses. The voltage of the secondary coil 14 of the transformer 6 changes in polarity, and the diode 24 becomes conducting, so that the capacitor 25 charges up. Furthermore, the base voltage of the transistor 7 becomes more and more negative with respect to ground. The battery 2, which is connected in parallel to the capacitor 25, as well as the motor 1, receive a voltage which is formed at the capacitor 25. When this voltage exceeds the cut-off voltage of the zener diode, the transistor 17 becomes conducting and connects the base of the transistor 7 to ground. Thus, the b.o. type converter stops operating. Only when the voltage at the battery 2, as a consequence of current consumption to the motor 1, has been reduced to such an extent that the zener diode 20 and thus the transistor 7 again become blocking can the b.o. type converter again oscillate.

During operation with closed switches 21, 26, the circuit shown in the drawing forms a constant voltage source.

The zener diode 10 and the diode 9 essentially have the purpose of removing the peaks of kick-back voltage pulses, which form because of stray inductance.

The light-emitting diode 30 can indicate whether the battery 2 is being charged. If the battery 2 is not being charged, the switches 31, 21, 26 are all closed, i.e. the diode 30 is short-circuited and does not light up.

I claim:

1. A circuit for supplying a constant DC voltage to an electrical load and, alternatively, a relatively constant DC current to an electrical storage battery, connected in parallel with said electrical load from an input voltage source of relatively varying voltage potential, comprising:

a blocking oscillator including a transformer having a primary winding and a secondary winding, a switching transistor having first and second load terminals and a control terminal, and a first resistor;

said primary winding, said first and second load terminals of said switching transistor and said first resistor being connected in series across said input voltage source;

rectifier means connected in series with said electrical load across said secondary winding;

a controlling transistor having first and second load terminals and a control terminal;

a reference voltage element connected across said first and second load terminals of said controlling transistor and connected to said control terminal of said switching transistor; and a Zener diode having an anode connected to the control terminal of said controlling transistor and a cathode connected to said parallel arrangement of said electrical load and said storage battery.

2. A circuit according to claim 1, wherein said parallel arrangement of said electrical load and said storage battery includes a first switch connected through a second switch, said storage battery and a second resistor to said cathode of said Zener diode, and wherein a terminal of said electrical load is connected to a first terminal of said storage battery through an inductive element and is connected to a second terminal of said storage battery through said second switch.

3. A circuit as in claim 2, wherein said storage cell, said second resistor and said rectifier means are connected in series parallel to said secondary winding, said cathode of said rectifier means being connected to said secondary winding.

4. A circuit as in claim 2, further comprising a light emitting diode connected in series with said storage battery and a third switch connected in parallel with said light emitting diode, whereby said light emitting diode can be short circuited.

5. A circuit according to claim 1, further comprising a capacitor connected across the terminals of said electrical load.

6. A circuit according to claim 1, further comprising a third resistor connected between the base of said switching transistor and said primary winding and a second capacitor and a fourth resistor connected in series between the base of said switching transistor and said secondary winding.

* * * * *